Figure 1:
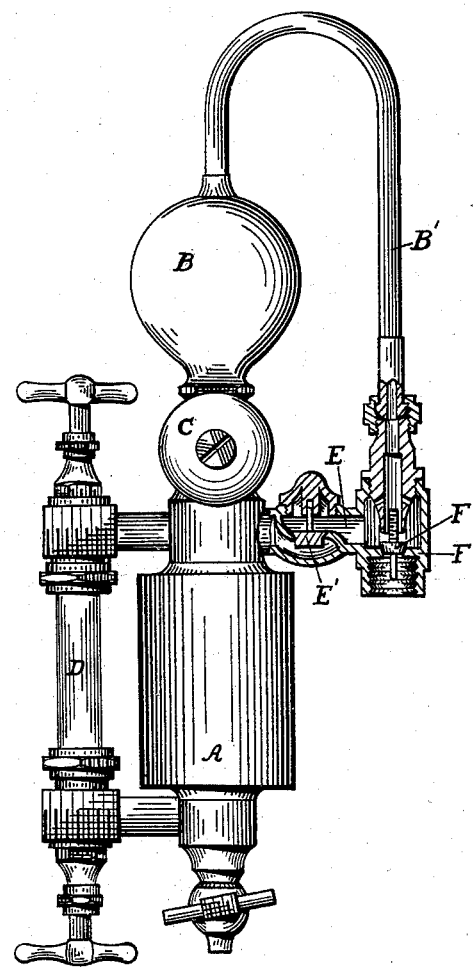

(No Model.) 2 Sheets—Sheet 1.

E. McCOY.
LUBRICATOR.

No. 270,238. Patented Jan. 9, 1883.

WITNESSES
Samuel E Thomas.
J. Edward Warren

INVENTOR
Elijah McCoy.
By W. W. Leggett.
Attorney

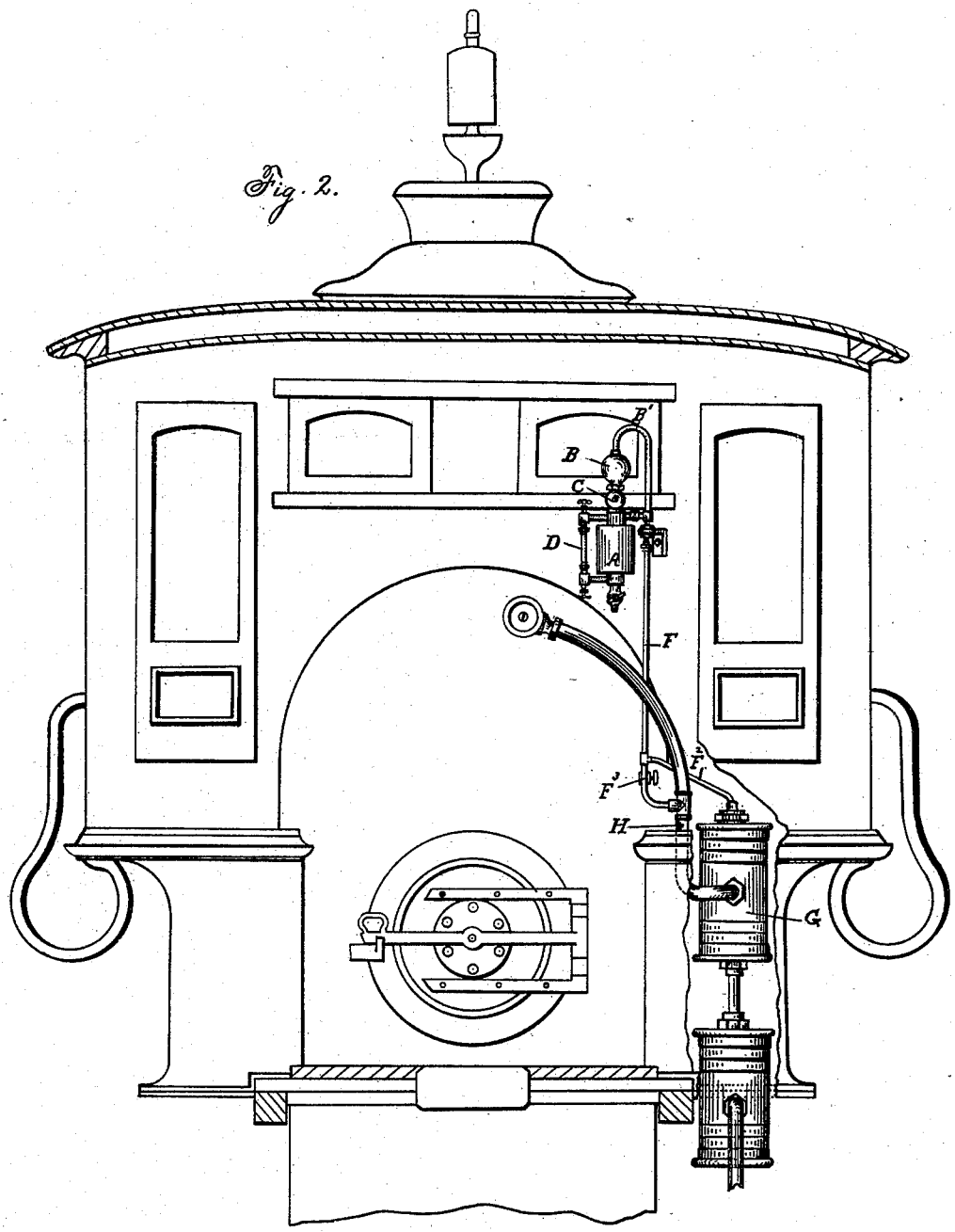

UNITED STATES PATENT OFFICE.

ELIJAH McCOY, OF DETROIT, MICHIGAN, ASSIGNOR TO HENRY C. HODGES AND CHARLES C. HODGES, OF SAME PLACE.

LUBRICATOR.

SPECIFICATION forming part of Letters Patent No. 270,238, dated January 9, 1883.

Application filed July 18, 1882. (No model.)

*To all whom it may concern:*

Be it known that I, ELIJAH McCOY, of Detroit city, county of Wayne, State of Michigan, have invented a new and useful Improvement in Lubricators; and I declare the following to be a full, clear, and exact description of the invention, such as will enable others skilled in the art to which it pertains to make and use it, reference being had to the accompanying drawings, which form a part of this specification.

My invention consists in the combination of devices and appliances hereinafter specified, and more particularly pointed out in the claims.

In the drawings, Figure 1 is a side elevation of a lubricator embodying my invention, showing parts in section. Fig. 2 shows the attachment of the lubricator to a locomotive-cab and the steam-cylinder of an air-brake pump.

This invention is designed more particularly for use upon air-brake pumps in other similar locations, and for other like purposes. My attention has been especially directed to locomotive attachments, and I have found that great difficulty has been experienced with lubricators heretofore constructed for supplying the steam cylinder and valves of air-brake pumps, from the fact, first, that when steam is shut off from the cylinder the pump works a vacuum, and by so doing raises the check-valve off from its seat and sucks the oil or other lubricant out of the oil-reservoir, unless the attendant bears in mind to close the valve in the oil-exit conduit when he shuts off steam from the steam-cylinder of the air-brake pump, and not uncommonly this fails to be done, and in consequence the oil is wasted and the supply in the reservoir is unnecessarily exhausted; second, from the fact that with ordinary lubricators constructed for this purpose the steam and oil conduit leading into the center of the steam-cylinder, the oil easily descends to the lower portion of said cylinder, but practically does not ascend to the upper portion of the cylinder and to the valves located therein. It has therefore been found necessary either to place an additional lubricator on the top of said cylinder, or to remove the top and pour in oil extravagantly to prevent the friction and the groaning caused thereby.

It is the purpose of my invention to remedy these difficulties, first, in the combination, with a lubricator provided with a check-valve, of a valve in the steam and oil conduit which works automatically, and when the pump works a vacuum, as already mentioned, prevents any waste or unnecessary exhaustion of oil; second, by providing the steam and oil conduit, which connects with the main steam-pipe leading to the steam cylinder, with an additional channel leading from said conduit to the top of said cylinder, and with a valve located beetween said channel and the main steam-pipe, by means of which the oil may be turned into the additional channel as desired to lubricate the valves.

To this end A represents the oil-reservoir, B a condenser.

B' is a pipe which conducts the steam into the condenser.

C is a regulating-valve for regulating the supply of condensed water to the reservoir.

D is an indicator-tube.

E is the outlet-pipe leading from the reservoir to the steam and oil conduit F. E' is a check-valve in said outlet-pipe.

F' is a suitable valve located in the steam and oil conduit. The construction of the valve F' is such that when a vacuum is created by the pump, as above described, said valve is automatically drawn to its seat and prevents the unnecessary discharge of oil. When the piston in the steam-cylinder is working with steam applied the action of the pump opens and closes the valve F', allowing steam to ascend and oil to descend to the parts to be lubricated, as shown in Fig. 2.

G is the steam-cylinder of any ordinary air-brake pump. For the purpose of feeding the oil into the top of said steam-cylinder and to the valves located therein, as well as into its center, I construct the steam and oil conduit F, which connects with the main steam-pipe H, with the additional channel $F^2$, adapted to conduct the oil into the top of said cylinder and to said valves. I also provide the conduit F with a suitable valve, $F^3$, situated between the channel $F^2$ and the main steam-pipe H. With a channel located in this position it is evident that more or less oil will continuously descend through it into the top of the cylinder and to the valves; but should it be desired to feed a greater supply of oil through said channel, for the purpose of lubricating said parts more thoroughly, it is obvious that by closing the valve F³ the oil may be effectually conducted into said channel for any desired period.

I am aware that other lubricators have been constructed with a check-valve in the oil-exit pipe; but I am not aware that an additional valve has been located in the steam and oil conduit for the purpose of preventing the unnecessary discharge of oil should the check-valve be lifted from its seat when the pump works a vacuum. Therefore,

What I claim is—

1. The combination, with a lubricator provided with a check-valve, of a steam and oil conduit provided with a suitable valve, said valve adapted to be forced to its seat when the pump works a vacuum, and to be opened and closed by the action of the pump when steam is applied, substantially as and for the purpose described.

2. The combination, with a lubricator, of a steam and oil conduit adapted to communicate oil to the center of the steam-cylinder of an air-brake pump, said conduit provided with an additional channel adapted to convey oil into the top of said cylinder, and to the valves located therein, substantially as described.

3. The combination, with a lubricator, of a steam and oil conduit connected with the main steam-pipe, and adapted to communicate oil to the center of the steam-cylinder of an air-brake pump, said conduit provided with an additional channel adapted to convey oil into the top of said cylinder, and to the valves located therein, and in connection therewith a suitable valve located in said conduit, between the additional channel and the main steam-pipe, substantially as and for the purpose described.

4. The combination, with a lubricator, of a steam and oil conduit connected with the main steam-pipe, said conduit provided with a suitable valve, F', an additional channel, F², and a valve, F³, located between said channel and the main steam-pipe, substantially as and for the purpose described.

In testimony whereof I sign this specification in the presence of two witnesses.

ELIJAH McCOY.

Witnesses:
N. S. WRIGHT,
J. EDWARD WARREN.